July 15, 1958 — R. A. SCHAFER — 2,842,987
MACHINE TOOL PROCESSING APPARATUS
Filed Dec. 20, 1954 — 6 Sheets-Sheet 1
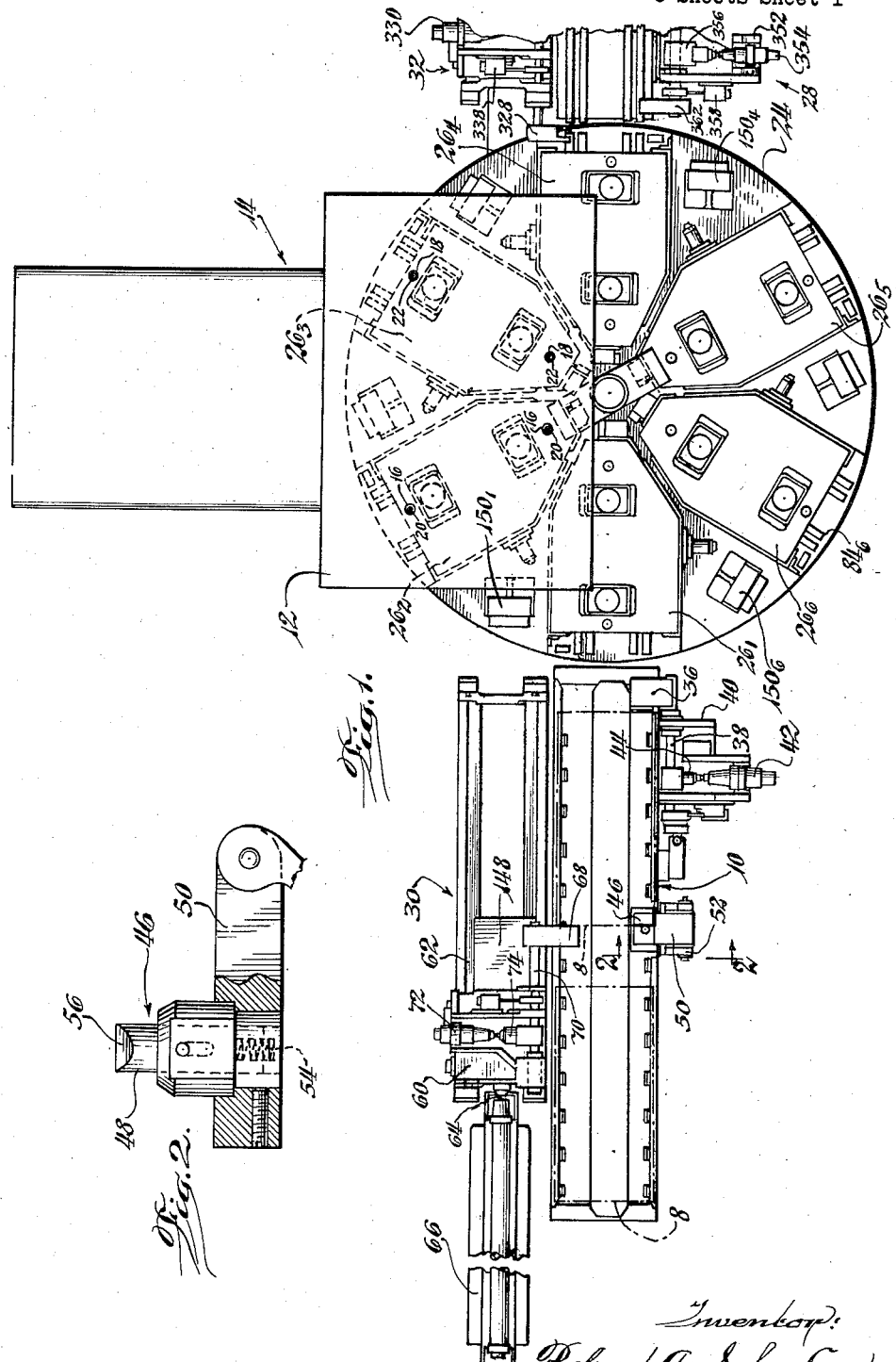

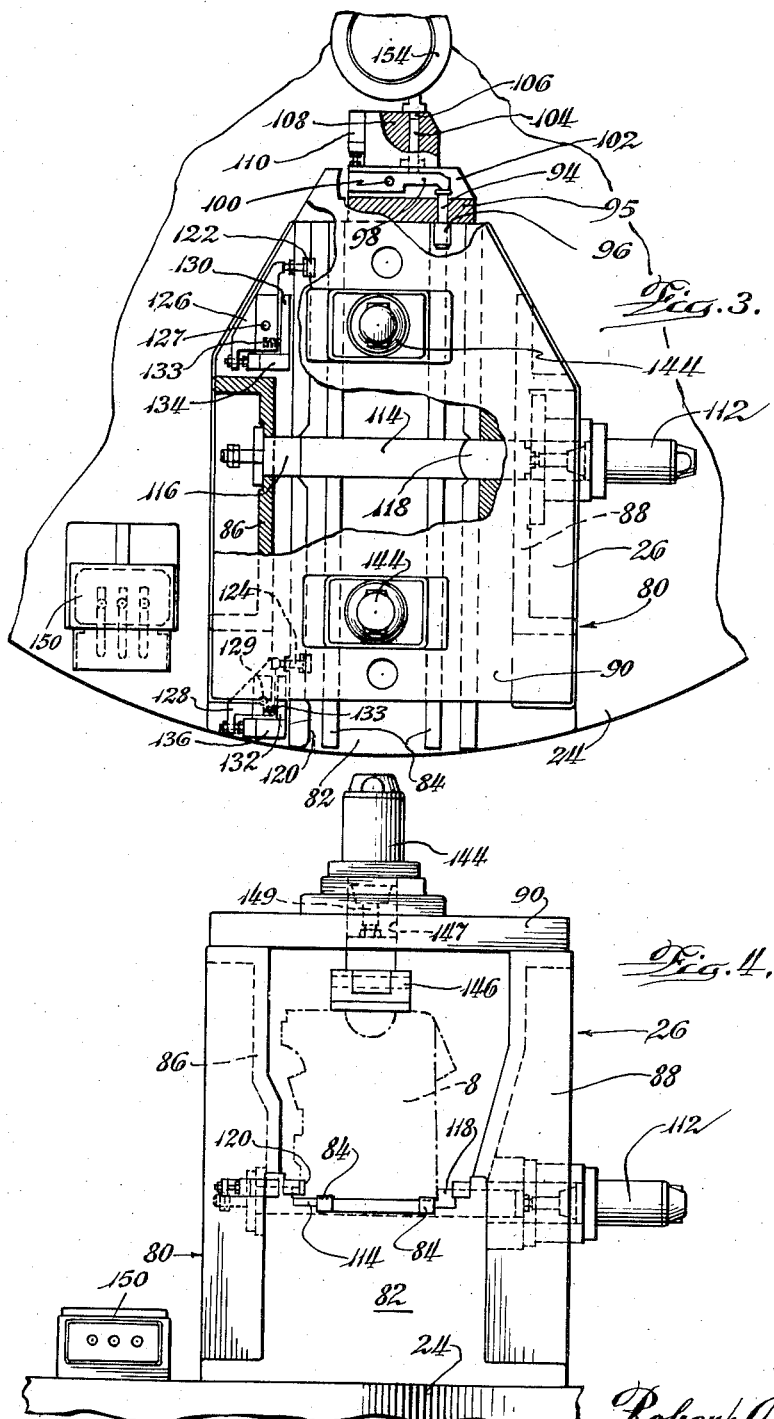

July 15, 1958 R. A. SCHAFER 2,842,987
MACHINE TOOL PROCESSING APPARATUS
Filed Dec. 20, 1954 6 Sheets-Sheet 3

INVENTOR:
Robert A. Schafer
By Ahlberg, Nupper & Gradolph
Attorneys

July 15, 1958
R. A. SCHAFER
2,842,987
MACHINE TOOL PROCESSING APPARATUS
Filed Dec. 20, 1954
6 Sheets-Sheet 4
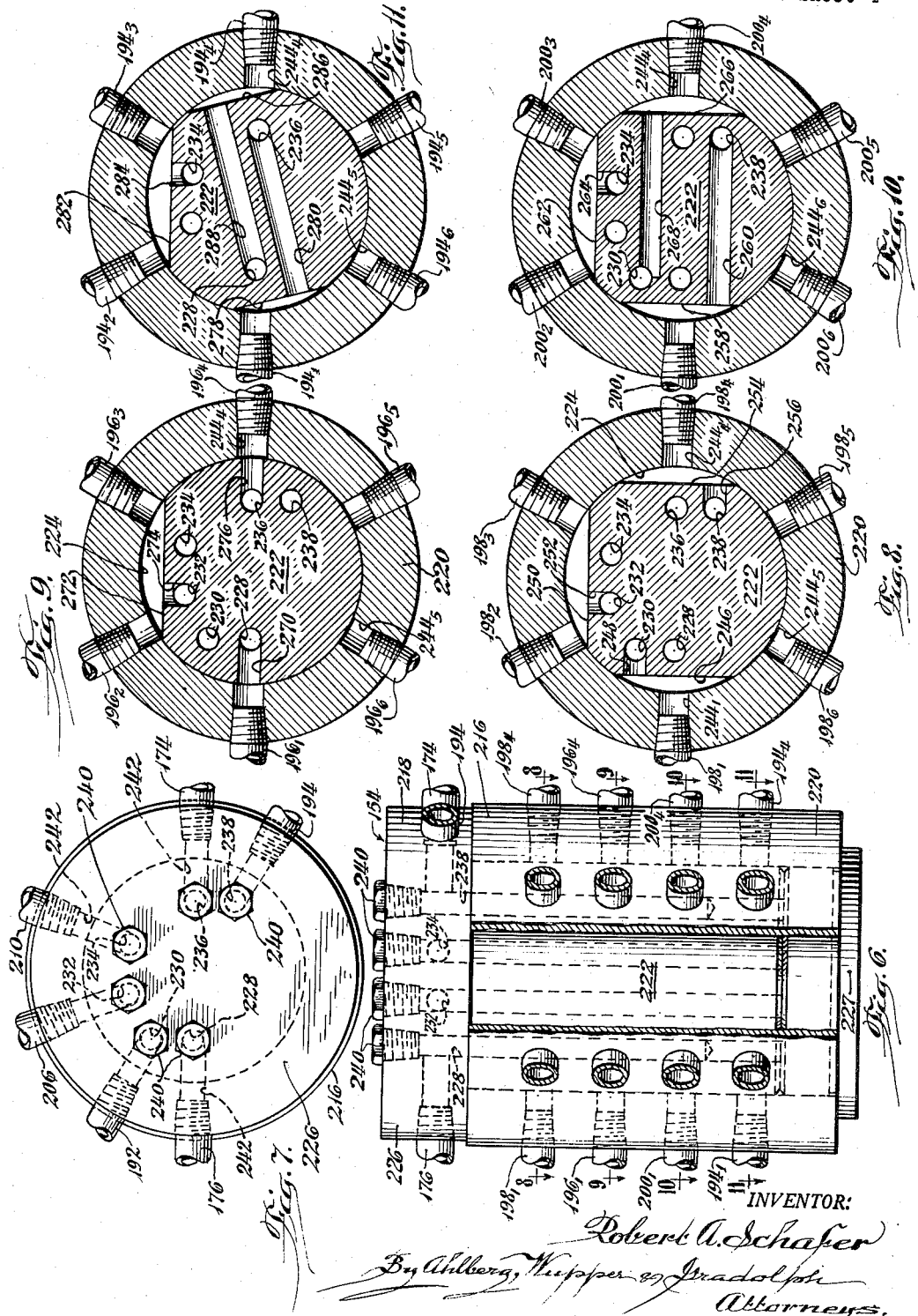
INVENTOR:
Robert A. Schafer
By Ahlberg, Hupper & Bradolph
Attorneys.

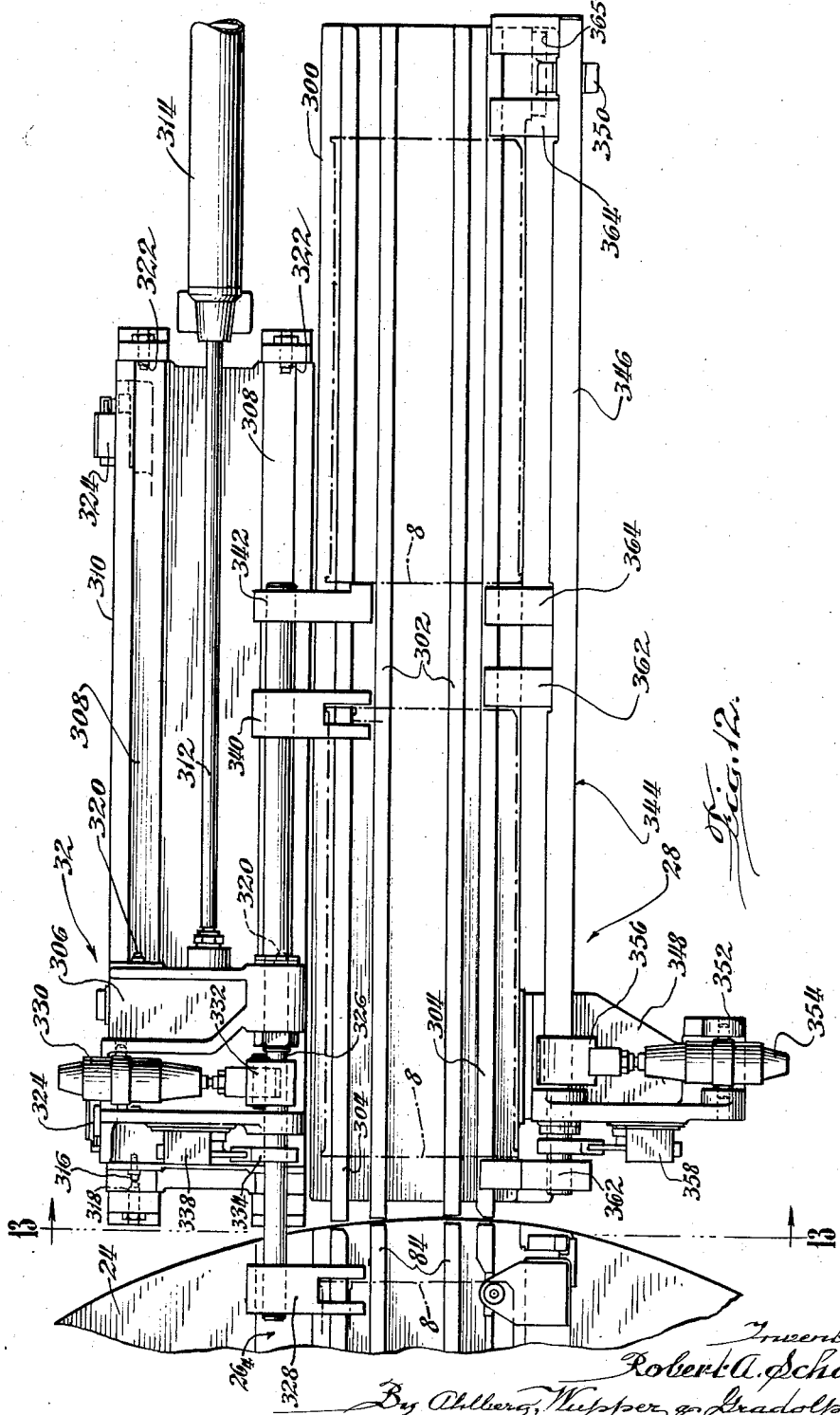

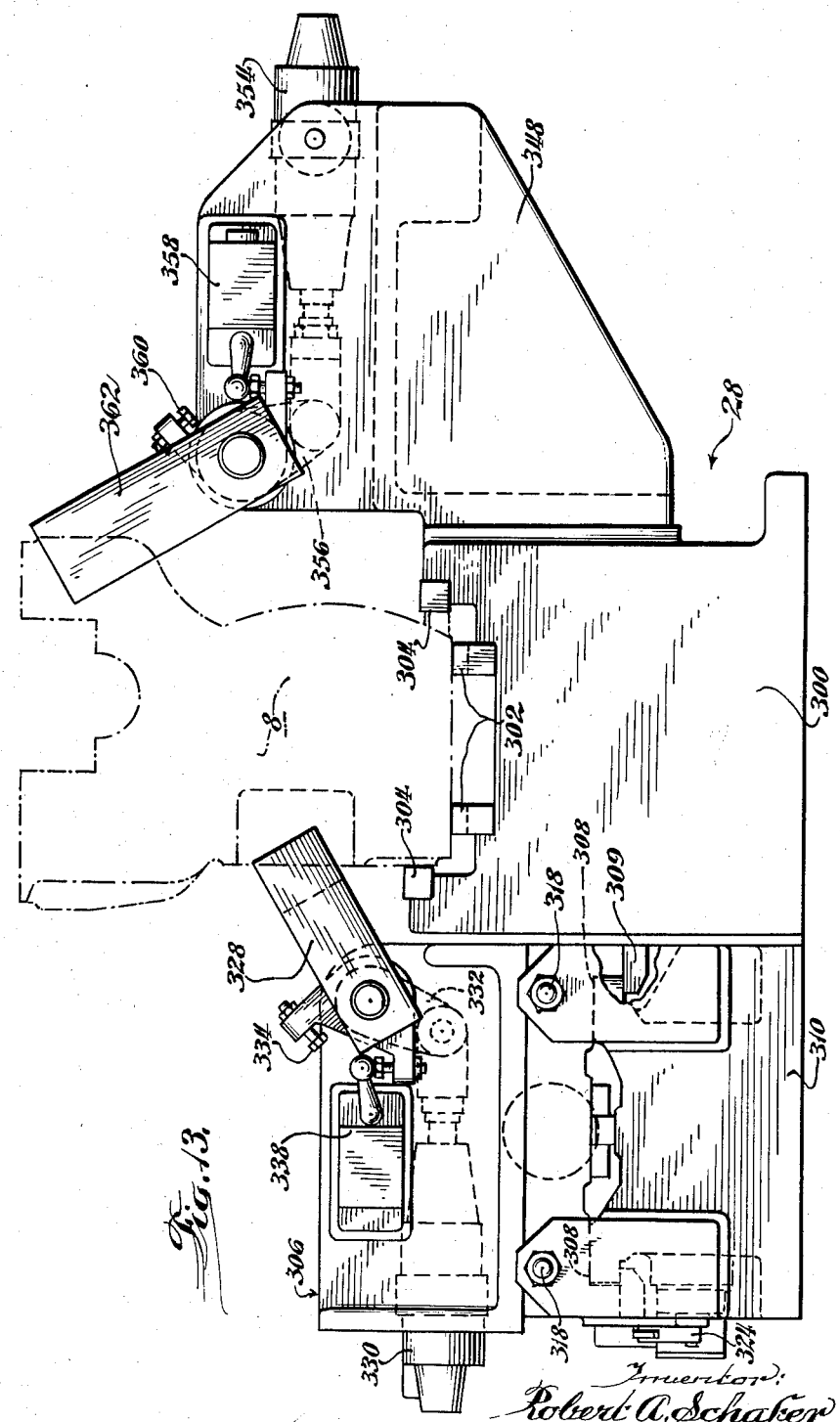

United States Patent Office 2,842,987
Patented July 15, 1958

2,842,987

MACHINE TOOL PROCESSING APPARATUS

Robert A. Schafer, Richmond, Ind., assignor to National Automatic Tool Company, Inc., Richmond, Ind., a corporation of Indiana Application December 20, 1954, Serial No. 476,442

1 Claim. (Cl. 77—64)

The present invention relates to automatic processing machinery in which a series of machining operations are performed on a procession of castings or other workpieces.

One object of the invention is to provide improved machine tool processing apparatus in which an annular array of workholders, operated by an improved hydraulic control system, is used to receive a succession of workpieces in a loading and unloading zone, support the workpieces in a machining zone, and release the workpieces in the loading and unloading zone.

Other objects and advantages will be evident from the following description of the exemplary embodiment of the invention illustrated in the drawings, in which:

Figure 1 is a plan view of machine tool processing apparatus incorporating the invention;

Fig. 2 is a fragmentary view on an enlarged scale taken along the line 2—2 of Fig. 1;

Fig. 3 is a partially sectioned fragmentary plan view showing on an enlarged scale a segment of the rotary workpiece support structure of Fig. 1;

Fig. 4 is an end view of Fig. 3;

Fig. 6 is a side view of a rotary fluid distributing manifold used with the hydraulic clamping system;

Fig. 7 is a top view of Fig. 6;

Fig. 8 is a horizontal sectional view taken along line 8—8 of Fig. 6;

Fig. 9 is a horizontal sectional view taken along line 9—9 of Fig. 6;

Fig. 10 is a horizontal sectional view taken along line 10—10 of Fig. 6;

Fig. 11 is a horizontal sectional view taken along line 11—11 of Fig. 6;

Fig. 12 is an enlarged plan view of the workpiece unloading mechanism and a fragment of the rotary workpiece support structure; and Fig. 13 is a sectional view taken generally along the line 13—13 of Fig. 12.

Figure 5:
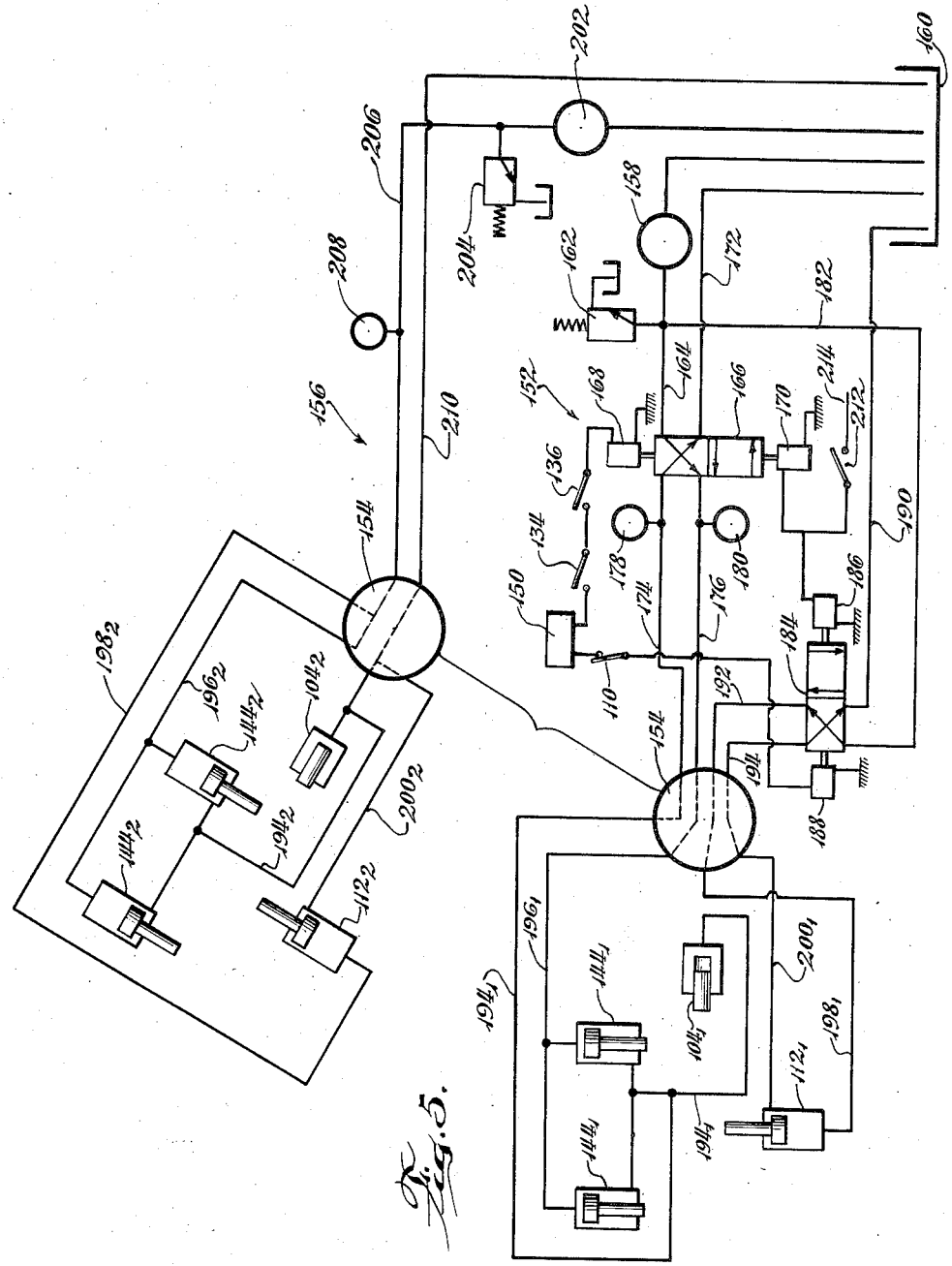
Fig. 5 is a diagrammatic view of a hydraulic system used in clamping workpieces in the various workholders.

The illustrated embodiment of the invention, Fig. 1, is adapted to be mounted at the beginning of an automatic processing line of machine tools to take hold of workpieces 8 placed on a receiving station 10 and operate automatically to drill and ream accurately two locating holes in the individual workpieces and continue the workpieces in the line at cyclic intervals of approximately one half the total time required to drill and ream the holes in each workpiece. The apparatus shown is designed to process castings for the cylinder blocks of internal combustion engines. The drilling and reaming operations are performed simultaneously on two different workpieces by a single downward feeding stroke of a broad, multiple spindle machining head 12. The machining head 12 is a part of an automatic drilling machine 14 of conventional construction. As the specific details of the machine 14 form no part of the present invention, only an outline of the machine is shown in Fig. 1.

Two pairs of spindles 16, 18 extend downwardly from the underside of the head 12 at two horizontally spaced machining stations. The spindles 16 for the first machining station, located generally under the left end of the head 12, Fig. 1, carry two drill bits 20. The spindles 18 for the second machining station, located generally under the right end of the machining head, carry two reaming bits 22.

The machining head 12 overlies one side of a circular, horizontal support or table 24 mounted for rotation in the clockwise direction, Fig. 1, about a central vertical axis. In making one turn the support 24 is rotatably indexed to and accurately located in six successive working positions. Indexing means suitable for this purpose are well known in the machine tool art and need not be described here.

The support 24 carries six automatically operated workholders 26 evenly spaced around the rotary axis of the support. For convenience in description, the six successive stations of each workholder 26 will be distinguished by adding the subscripts 1 to 6 to the numerals denoting the workholders and associated structure located in the successive stations, starting with the workholder alined with the receiving station 10 and continuing in the clockwise direction, Fig. 1.

For each angular working opposition of the support 24, two adjacent workholders $26_2$ and $26_3$ are located in the two previously mentioned machining stations under opposite ends of the head 12. The two workholders $26_1$ and $26_4$ at opposite sides of the workholders $26_2$ and $26_3$ are alined, respectively, with the receiving station 10 and with an unloader 28 located diametrically opposite each other across the rotatable support 24.

A loading mechanism 30 at the receiving station 10 automatically loads a workpiece into the adjacent workholder $26_1$. The workholder $26_1$ automatically clamps the workpiece and maintains a steady clamping pressure on the workpiece while it is carried in the workholder first to the drilling station $26_2$ and then to the reaming station $26_3$ under the machining head 12 by step by step clockwise indexing movement of the support 24, Fig. 1. Interlocking controls provide for a complete machining cycle of the head 12 between each indexing movement of the support 24. Controls suitable for this purpose are available in the machine tool art and do not require specific description here.

The next indexing movement of the support 24 carries the workholder to the unloading station $26_4$ where the workpiece in the holder is automatically unclamped and removed from the holder by a self-operating mechanism 32 of the unloader 28 generally similar in construction to the loading mechanism 30. The unloader 28 forms a continuation of a processing line of machine tools that begins with the receiving station 10.

A fuller understanding of the invention may be gained from the following descriptions of the major components of its structural embodiment.

Loading mechanism

The mechanism used to load workpieces into the workholders 26 comprises a horizontal roller conveyor 10 forming the previously mentioned receiving station denoted by the same reference numeral. The conveyor 10 shown has an effective width just sufficient to accommodate the workpieces; i. e., cylinder block castings; and a length somewhat greater than twice the length of the workpieces. From an inner end immediately adjacent the periphery of the support 24, the conveyor 10 extends outwardly along a radial line from the rotary axis of the support.

A workpiece 8 placed on the outer end of the conveyor 10 (as shown in phantom in Fig. 1) is moved forwardly to engage a movable abutment 36 at the end of the conveyor adjacent the support 24 (as shown by the second workpiece illustrated in phantom). Workpieces can be placed on the conveyor 10 and moved forwardly by either manually operated means or by automatic indexing apparatus of a suitable conventional design readily available in the machine tool art. The abutment 36 extends laterally from a rock shaft 38 journaled in a bracket 40 on one side of the conveyor 10. A reversible hydraulic actuating cylinder 42 swingably mounted on the bracket 40 and connected to a radial arm 44 on the rock shaft 38 rotates the shaft in opposite directions to swing the abutment 36 into and out of an operative position in the path of movement of a workpiece 8 along the conveyor 10.

In moving to the forward end of the conveyor 10, a workpiece 8 passes over a one-way stop dog 46 which snaps up behind the workpiece just before it engages the abutment 36. The stop dog 46 and the abutment 36 then prevent any substantial shifting movement of the workpiece 8 along the conveyor 10.

Structurally the stop dog 46 comprises an upright plunger 48 mounted for vertical movement in a support 50 hinged to a bracket 52 mounted on the same side of the conveyor 10 as the bracket 40, Figs. 1 and 2. The plunger 48 is urged upwardly to its operative position by a spring 54. In moving forwardly along the conveyor 10, a workpiece 8 engages an outwardly facing, sloping surface 56 on the upper end of the plunger 48, depressing the plunger until the workpiece has passed on.

A workpiece resting on the forward end of the conveyor 10 is located with sufficient accuracy by the stop dog 46 and the abutment 36 to be readily engaged by the loading mechanism 30 and moved into the workholder 26.

The loading mechanism 30 includes a slide 60 supported on elongated ways 62 mounted in parallel relation to the conveyor 10 on the side thereof opposite the bracket 40. The slide 60 is moved reversely along the ways 62 by a connecting rod 64 extending to a horizontal actuating cylinder 66 mounted on the end of the ways opposite the support 24. An actuating dog 68 extending laterally from a support shaft 70 journaled in the slide 60 is swung into and out of overlying relation to the conveyor 10 by a reversible actuating cylinder 72 swingably mounted on the slide 60 and connected to a radial arm 74 on the shaft 70 to rock the shaft in opposite directions.

In operation, the actuating arm 68 is turned upwardly to an inoperative position by the cylinder 72 and the slide 60 is retracted by the cylinder 66 along the ways 62 to the position shown in Fig. 1. The cylinder 72 is operated in the reverse direction to move the actuating arm 74 down behind the rear portion of a workpiece 8 resting on the conveyor 10 between a dog 46 and the abutment 36.

At this juncture, the abutment 36 is moved to an inoperative position by the cylinder 42 and the slide 60 is advanced by the cylinder 66 to move the workpiece off the front end of the conveyor 10 into the workholder $26_1$. After the workpiece is clamped in the workholder $26_1$, the actuating arm 68 is then rotated to an inoperative position and the slide 60 retracted to continue the cycle. The abutment 36 is returned to operative position by the actuator 42.

The movements of the actuating cylinder 42 for the abutment 36, the actuating cylinder 66 for the slide 60, and the actuating cylinder 72 for the arm 68 are coordinated by suitable electric and hydraulic controls that can be provided readily by those skilled in the art.

*Workholder and workpiece clamps thereon*

As shown in Figs. 3 and 4, each of the workholders 26 comprises a frame 80 including a base 82 extending radially along the support 24 to the adjacent peripheral edge of the support. Workpiece support rails 84 run inwardly along the top of the base 82 from the periphery of the support 24 for substantially the full length of the base. Two portions 86, 88 of the frame 80 extending upwardly from opposite sides of the base 82 support a flat plate 90 fixed in overlying spaced relation to the rails 84.

A plunger 94, parallel to the rails 84 and located somewhat above the rails, extends slidably through an upright abutment 95 on the inner end of the base 82, Fig. 3. The outer end of the plunger 94 is enlarged to form a circular abutment 96 facing the abutment 95.

The opposite or inner end of the plunger 94 engages one end of a horizontal lever 98 centrally pivoted at 100 to a support 102 on the rear side of the abutment 95. A medial portion of the lever 98 between the pivot 100 and the plunger 94 is engaged by a plunger 104 extending rearwardly into a hydraulic cylinder 106 formed in a block 108 mounted behind the support 102. The hydraulic plunger 104 is used in forcing the plunger 94 toward the outer end of the workholder.

Rearward movement of the plunger 94, which is sufficient to engage the plunger abutment 96 with the abutment 95, acts through the lever 98 to operate a switch 110 mounted on the block 108 and coacting with the opposite end of the lever.

The switch 110 is used with a hydraulic workpiece positioning and clamping system, to be presently explained in greater detail, to control a reversible hydraulic actuating cylinder 112 mounted on one side of the frame 80 and connected to an elongated positioning member 114 extending transversely across the central portion of the base 82, somewhat below the upper surfaces of the rails 84, Figs. 3 and 4. Two workpiece engaging members 116, 118 extend upwardly from the member 114 at opposite sides of the rails 84 to embrace the opposite sides of a workpiece 8 resting on the rails.

A workpiece 8 upon being loaded into a workholder 26 is moved inwardly along the rails 84 by the loading mechanism 30. The rear or inner end of the workpiece engages the plunger 94 and moves the plunger rearwardly until the plunger abutment 96 engages the fixed abutment 95 to locate the workpiece longitudinally in the workholder.

While pressure is still applied to the workpiece by the loading mechanism 30, the switch 110 operates to energize the actuating cylinder 112. The cylinder 112 moves the member 114 to the left, Fig. 3, and acts through the engaging member 118 to slide the workpiece laterally into engagement with a horizontal locating rail 120 extending along the frame base 82 at the left side of the support rails 84.

The workpiece 8 in moving into engagement with the locating rail 120 actuates two plungers 122, 124 extending through the rail near opposite ends of the frame base 82. The outer ends of the plungers 122, 124 connect with two horizontal levers 126, 128 medially pivoted 127, 129 to brackets 130, 132 on the adjacent side of the base 82. Two compression springs 133, seated between the brackets 130, 132 and the respective levers 126, 128 bias the latter about the pivots 127, 129 in directions for urging the plungers 122, 124 toward the support rails 84. Two electrical switches 134, 136, connected in series, are mounted on the respective brackets 130, 132 for actuation by the ends of the levers 126, 128 opposite the plungers 122, 124.

Upon movement of the workpiece 8 into engagement with the locating rail 120, both switches 134, 136 are closed. The switches act through the hydraulic clamping system to be presently explained in detail to effect energization of two hydraulic clamping cylinders 144 mounted on the plate 90 and spaced along the rails 84. Two clamping heads 146 located generally below the plate 90 are guided in vertical bores 147 in the plate and connected with piston rods 149 extending downwardly from the respective cylinders 144. Energization of the cylinders 144 upon closing of the switches 134, 136 forces the clamping heads 146 downwardly into firm engagement with the workpiece 8 to hold it in fixed position on the rails 84.

The control switches 110, 134, and 136 of each workholder 26 are electrically energized through an electrical terminal unit 148 mounted on the loading mechanism slide 60 to connect with a terminal unit 150 fixed to the support 24 when the slide is moved into its forward position as an incident to loading a workpiece into the workholder. After the workpiece is located and clamped in the workholder in the manner described the slide 60 is retracted, breaking the connection between the movable terminal unit 148 and the terminal unit 150. In all, six identical terminal units 150 are provided on the support 24 on the clockwise side of the respective workholders 26 (Fig. 1).

Hydraulic clamping system for workpieces

As illustrated diagrammatically in Fig. 5, a first hydraulic supply system 152 (shown in the lower portion of the figure) is connected to a rotary distributing valve manifold 154 to supply operating fluid under pressure through the manifold to the hydraulic positioning and clamping actuators $104_1$, $112_1$, and $144_1$ of each workholder 26 when the latter is in loading position. Upon movement of the workholder to the adjacent drilling station, as indicated by the reproduction of the diagrammatic illustration of the locating and clamping actuators in the upper portion of Fig. 5, the hydraulic positioning and clamping actuators on the workholder are disconnected by the distributing valve manifold 154 from the hydraulic system 152 and then connected through the manifold to a second hydraulic system 156 which supplies clamping fluid under constant pressure to the actuators while the workholder is located in drilling and reaming positions.

Upon movement of the workholder 26 to its unloading station opposite the unloader 28, the valve manifold 154 reconnects the hydraulic positioning and clamping actuators of the workholder to the first hydraulic system 152 in the same manner as shown in the lower portion of Fig. 5. The detailed construction of the valve manifold 154 will be described later under a separate heading.

The first hydraulic system 152 comprises a pump 158 which supplies hydraulic fluid from a reservoir 160 to a pressure regulator 162. From the regulator 162 a first branch line 164 leads to a fluid supply inlet of a four-way reversing valve 166 controlled by two solenoids 168, 170. An exhaust line 172 returns fluid from the valve 166 back to the reservoir 160. Two parallel fluid lines 174, 186 extend from the valve 166 to the distributing valve manifold 154.

Two pressure responsive switches 178, 180, connected hydraulically to the respective lines 174, 176, are electrically interconnected in a suitable manner with the controls for the actuating cylinder 66 of the loading mechanism 30 to coordinate movement of the slide 60 with the build up in pressure in the lines 174, 176.

A second branch line 182 from the pressure regulator 162 connects with a four-way valve 184 operated by two solenoids 186, 188. An exhaust line 190 from the valve 184 extends back to the reservoir 160. Two parallel hydraulic lines 192, 194 run from the valve 184 to the distributing valve manifold 154.

When a workholder 26 is in loading position, corresponding to the lower diagrammatic illustration in Fig. 5, the distributing manifold 154 connects the line 174 from the reversing valve 166 with a line 194, leading to the hydraulic actuator 104 and to the piston or unclamping ends of the two clamping cylinders 144. At the same time a line 196, from the clamping ends of the two clamping cylinders 144, is connected through the valve manifold 154 to the line 176.

Other passages in the valve assembly 154 connect the lines 192, 194 from the reversing valve 184 with lines 198 and 200, leading respectively to the clamping and unclamping ends of the locating actuator $112_1$.

Upon movement of a workholder 26 into its loading position the reversing valves 166 and 184 are located in operating positions opposite from that shown in Fig. 5. Thus the pump 158 is connected through the valve 166 to the line 174 leading through the manifold 154 and the line 194 to the locating actuator $104_1$ and the unclamping ends of the clamp actuators $144_1$. The branch line 182 from the pump is connected through the valve 184 to the line 194 leading through the manifold $154_1$ to the releasing end of the locating cylinder $112_1$.

The previously mentioned switch 110, actuated by the plunger 94 as an incident to longitudinal movement of a workpiece into the workholder $26_1$, is connected between the terminal unit 150 and the solenoid operator 188 for the reversing valve 184, Figs. 3 and 5. Closure of the switch 110 causes the reversing valve 184 to be shifted back to the position shown, thus connecting the pump 158 through the manifold 154 to the locating or clamping end of the actuator $112_1$. The actuator $112_1$ then moves the workpiece laterally into engagement with the locating rail 120 in the workholder $26_1$ in the manner described.

The previously mentioned control switches 134, 136 are connected in series between the terminal unit 150 and the solenoid 168 to shift the reversing valve 166 back to the position shown after lateral positioning of the workpiece by the actuator $112_1$. This connects the locating actuator $104_1$ and the unclamping ends of the clamping actuators $144_1$ to drain and applies hydraulic pressure from the pump 158 through the manifold 154 to the clamping ends of the actuators $144_1$ to clamp the workpiece in position as described.

Upon indexing of the workholder from loading position to the adjacent drilling station, the distributing manifold 154 breaks the connection between the first hydraulic system 152 and the actuators $104_1$, $112_1$, and $144_1$ on the workholder. Actuating fluid is trapped under pressure in the positioning actuator 112 and in the clamping actuators 144. When the workholder $26_2$ reaches the drilling station the hydraulic clamping and locating actuators $112_2$, $144_2$ on the workholder are connected to the second hydraulic system 156 in the manner indicated diagrammatically in the upper portion of Fig. 5.

The second hydraulic system 156 comprises a pump 202 which pumps fluid from the reservoir 160 to a pressure regulator 204 connected through a line 206 with the distributing valve manifold $154_2$. A pressure responsive switch 208 connected to the line 206 serves as a check on the clamping pressure within the line. The manifold 154 maintains a connection between the pressure line 206 and the lines $196_2$ and $198_2$ leading to the clamping ends of the actuators $144_2$ and $112_2$ from the time the workholder reaches the drilling station until it leaves the adjacent reaming station. At the same time, the line $200_2$ from the unclamping end of the actuator $112_2$ and the line $194_2$ from the locating actuator $104_2$ and the unclamping ends of the actuators $144_2$ are both connected through the manifold $154_2$ to a drain line 210 leading back to the reservoir 160.

The clamping and unclamping of a workpiece in a workholder 26 at the diametrically opposed loading and receiving stations causes some fluctuation in the pressure within the hydraulic system 152. However, the use of the separate hydraulic system 156 to supply fluid under pressure to the actuators 112 and 144 while the workholder is in the drilling and reaming stations assures that the clamping pressure on the workpiece is maintained at all times to hold the workpiece steady until both machining operations are completed. This avoids any errors in machining which might otherwise arise from any diminishing of the clamping pressure.

Upon movement of a given workholder 26 from the reaming station below the machining head 12 to the unloading station, the distributing valve manifold 154 operates to reconnect the hydraulic actuators on the workholder with the hydraulic system 152. In a manner to be more fully explained in connection with the specific construction of the distributing manifold 154, the manifold connects the clamping ends of the actuators 112 and 144 to drain and applies fluid under pressure to the unclamping ends of the actuators 112 and 144 and to the actuator 104. The clamping actuators 144 release the clamping heads 146 from the workpiece and the actuator 112 exerts a pulling force on the positioning member 114, causing the member 116 to engage the workpiece and move it laterally away from the rail 120 in the workholder. The actuator plunger 94 is moved outwardly against the workpiece.

Upon removal of a workpiece from the workholder $26_4$ by the unloading mechanism 32, an interlock switch 212 connected between a power line 214 and solenoids 170 and 186, Figs. 5 and 12, is operated by the unloading mechanism to shift the reversing valves 166 and 184 to positions opposite from those shown in Fig. 5. This conditions the workholder $26_1$ to receive a workpiece upon advancement of the loading mechanism 30 as previously explained.

Distributing valve manifold

Even though the distributing valve manifold 154 is capable of performing a large number of interrelated valving functions in sequence, as an incident to the rotary indexing movement of the workholder support 24, the manifold, nevertheless, is formed from a strikingly small number of inexpensive structural components.

As shown in Figs. 6 through 11, the manifold 154 comprises a vertical cylindrical sleeve 220 rotatable with the workholder support 24. A fixed cylindrical member 222 extends downwardly into the sleeve 220 forming a close fit with the inner cylindrical surface 224 of the sleeve. The upper end of the cylindrical member 222 is sharply enlarged radially to form a cylindrical head 226 having a close sliding fit with the upper end of the sleeve 220. It will be appreciated that the head 226 and the depending member 222 can be fashioned from a cylindrical blank merely by turning down a section of the blank to form the portion 222. The lower end of the sleeve 220 is closed by a plug 227.

Six circumferentially spaced, axial bores 228, 230, 232, 234, and 238 extend downwardly into the cylindrical member 222 from the upper surface of the head 226. The bores 228 and 230 are located generally in the side of the member 222 adjacent the loading station of the workholders 226. The bores 232 and 234 are located in the side of the member 222 near the drilling and reaming stations of the workholders, and the two bores 236 and 238 are located in the side of the member 222 near the unloading station of the workholders. The upper end of each bore 228 to 238 is closed by a plug 240 in the head 226.

Six horizontal bores 242 extend radially into the head 226 to communicate with the respective vertical bores 228 to 238 below the plugs 240. The outer ends of the radial bores 242 are tapped to receive connecting lines from the hydraulic supply systems 152 and 156 previously described in connection with the diagrammatic illustration in Fig. 5. Thus, as shown in Figs. 6 and 7 taken with Fig. 5, the bores 242 connect the line 176 with the bore 228, the line 192 with the bore 230, the line 206 with the bore 232, the line 210 with the bore 234, the line 174 with the bore 236, and the line 194 with the bore 238.

Connections from the various bores 228 to 238 to the hydraulic positioning and clamping actuators on all six workholders 26 are made through the sleeve 220. As shown in Figs. 6 and 8 to 11, the four lines 194, 196, 198 and 200, leading to each workholder, are threaded into four radial bores 244 in the sleeve 220. The four sleeve bores 244 for each workholder 26 are spaced from each other in a straight vertical row. The vertical rows of sleeve bores and the lines connected into the bores are duplicated at six evenly spaced intervals around the sleeve 220 for the respective workholders.

The twenty-four lines 194 to 200 threaded into the sleeve 220 are connected in proper order and sequence with the six axial bores 228 to 238 in the member 222 by simple horizontal kerfs and bores in the member 222 merely as an incident to rotation of the sleeve.

As shown in Figs. 8 to 11, all the connecting lines leading from the two workholders in the two idle stations between the unloading and loading stations are blocked off from the axial bores in the member 222.

As shown in Figs. 6 and 8, the lines 198, leading to the clamping or locating ends of the locating actuators 112 in the respective workholders 26, connect with the uppermost level of six circumferentially spaced radial bores 244 in the sleeve 220. The line $198_1$ from the workholder $26_1$ in loading position communicates through a horizontal kerf 246 and a bore 248 in the member 222 with the axial bore 230, and hence with the line 192 from the reversing valve 184, Fig. 5. Clockwise indexing movement of the sleeve 220, Fig. 8, carries the bore $244_1$, for the line $198_1$ beyond the end of the kerf 246 to lock fluid under pressure in the line.

The lines $198_2$ and $198_3$ for the two workholders $26_2$ and $26_3$ drilling and reaming positions both communicate through a horizontal kerf 250 and a horizontal bore 252 in the member 22 with the bore 232. Thus from the time a workholder reaches the drilling station until it leaves the reaming station the line 198 from the workholder is connected with the line 206 to receive fluid under constant pressure from the hydraulic system 156, Fig. 5.

As the workholder is indexed from its reaming station to its unloading station, the line 198 from the workholder passes clockwise beyond the kerf 250 and comes into alignment with a horizontal kerf 254 in the member 222, which communicates through a horizontal bore 256 with the bore 238. This establishes a connection between the line $198_4$ and the line 194 from the reversing valve 184 of the first hydraulic system 152.

As shown in Figs. 6 and 10, the lines 200 to the unclamping ends of the locating actuators 112 on the respective workholders 26 are connected to the third level (from the top) of radial bores 244 in the sleeve 220. The line $200_1$ from the workholder $26_1$ in loading position is connected through a horizontal kerf 258 and a horizontal bore 260 in the member 222 with the vertical bore 238, thus establishing communication with the line 194 from the reversing valve 184.

The lines $200_2$ and $200_3$ from the workholders $26_2$ and $26_3$ in the drilling and reaming stations are connected through a horizontal kerf 262 and a horizontal bore 264 in the member 222 with the bore 234 to communicate with the line 210 of the hydraulic system 156. The line $200_4$ from the workholder in the unloading position communicates with the bore 230 through a horizontal kerf 266 and a horizontal bore 268 in the member 222.

As shown in Figs. 6 and 9 the lines 196 from the clamping ends of the clamping actuators 144 in the respective workholders 26 are connected with the second level (from the top) of radial bores 244 in the sleeve 220. The line $196_1$ from the workholder in loading position connects through a horizontal bore 270 with the axial bore 228 to communicate with the line 176 from the reversing valve 166. The lines $196_2$ and $196_3$ from the two workholders in drilling and reaming stations communicate through a kerf 272 and a horizontal bore 274 in the member 222 with the vertical bore 132 to receive fluid from the line 206. The line $196_4$ from the workholder 26₄ in unloading position communicates through a horizontal bore 276 with the bore 236.

The lines 194 from the unclamping ends of the clamping actuators 144 and the locating actuator 104 of the various workholders 26 are connected into the lowermost level of the radial bores 244 in the sleeve 220. The line 194₁ communicates through a horizontal kerf 278 and a horizontal bore 280 with the axial bore 236. The lines 194₂ and 194₃ communicate through a horizontal kerf 282 and a horizontal bore 284 with the bore 234. The line 194₄ communicates through a horizontal kerf 286 and a horizontal bore 288 in the member 222 with the axial bore 228.

Despite its simple construction, the valve manifold 154 thus provided operates as previously stated merely by rotation of the sleeve 220 relative to the central member 222 to make in proper sequence the various interrelated connections between the two fluid supply systems 152 and 156 and the four connecting lines 194 to 200 leading to the hydraulic actuators on each of the six workholders 26. The manifold operates with unfailing certainty and eliminates in so far as the manifold is concerned any likelihood of a loss of pressure from either of the two hydraulic systems 152, 156.

Unloading mechanism

The unloader 28 including the unloading mechanism 32 is generally a mirror image of the workpiece loading mechanism 30 modified to perform a workpiece unloading rather than a loading function and to index the unloaded workpieces away from the unloading station.

The unloader 28 comprises a horizontally elongated bed 300 which starts near the periphery of the rotary workpiece support 24 and extends outwardly generally along a radial line from the center of the support 24 for a distance somewhat greater than twice the length of the workpieces 8 (two of which are shown in phantom in Fig. 12). A pair of horizontally spaced workpiece support rails 302 extend longitudinally along the full length of the bed 300. The end of the rails 302 adjacent the rotary workpiece support 24 are positioned for direct alignment with the workpiece support rails 84 in the workholder 26₄ located in unloading position. Two guide rails 304 extend longitudinally along the bed 300 just above opposite sides of the pair of workpiece support rails 302 and guide the workpieces 8 along the rails 302 as they are traversed away from the successive workholders 26 swung into unloading position.

The mechanism 32 used to unload workpieces from the workholders 26 as they are brought into alignment with the workpiece slide rails 302 comprises a slide 306 translatable along a pair of ways 308 extending longitudinally along an auxiliary bed 310 at one side of the main bed 300 of the unloader. The slide 306 is held down on the ways 308, which are parallel to the rails 302, by gibs 309. The slide 306 is moved toward and away from the rotary workpiece support 24 by a connecting rod 312 extending to a reversible hydraulic actuating cylinder 314 mounted on the outer end of the bed 310.

Movement of the slide 306 toward the support 24 is limited by engagement of abutments 316 on the slide with a pair of adjustable abutments 318 on the inner end of the base 310. In a similar manner abutments 320 on the outer end of the slide 306 engage abutments 322 on the outer end of the base 310 to terminate movement of the slide away from the rotary support 24. In moving to either end of this normal stroke, the slide actuates one of two switches 324 longitudinally spaced along the bed 310.

The switches 324 like others used with the workpiece unloader are used with an electrical and hydraulic control system for the unloader. It will be appreciated that various control systems of an acceptable design can be readily devised by those skilled in the art. Hence a specific description of the control system used is not necessary to an understanding of the invention.

Opposite ends of a rockshaft 326 journaled in the slide 306 extend toward and away from the rotary workpiece support 24 in parallel relation to the workpiece support rails 302 on the unloader bed 300. A bifurcated pawl or arm 328 is fixed to the inner end of the rockshaft 326 which extends into overlying relationship to the peripheral edge of the support 24 when the slide 306 is moved into forward position, as shown in Fig. 12. The free end of the pawl 328 is designed to engage a flange or projection on the workpiece 8 in the workholder 26₄ when the slide 306 is advanced to its forward position and the pawl is swung downwardly to an operative position.

The shaft 326 is rocked in opposite directions to swing the pawl 328 between a raised inoperative position and a lowered operative position by a reversible hydraulic cylinder 330 swingably mounted on the slide 306 and connected to a radial arm 332 on the shaft. Two operating members 334 mounted in angularly spaced relation on the shaft 326 actuate a control switch 338, Fig. 13, as the shaft 326 reaches either of its two extreme angular positions. The switch 338 is incorporated into the control system for the overall unloading mechanism 32.

In operation, the slide 306 is advanced to its forward position by the cylinder 314 with the pawl 328 swung to a raised inoperative position by the cylinder 330. As the slide 306 reaches its forward position, Fig. 12, the cylinder 330 operates to swing the pawl 328 downwardly to an operative position, Fig. 13, in which it engages a projection on the workpiece in the workholder 26₄. The slide 306 is retracted pulling the workpiece 8 from the workholder 26₄ to a first idle station on end portion of the rails 302 adjacent the support 24. The cylinder 330 again operates to swing the dog 328 to an inoperative position, leaving the workpiece positioned at the first idle station.

When the slide 306 and the rockshaft 326 operate again to remove another workpiece from the next workholder 26 moved into unloading position, the workpiece positioned on the first idle station on the bed 300 is indexed to a second idle station on the support rails 302 by a second bifurcated pawl 340 fixed to the end of the rockshaft 326 extending away from the workpiece support 24. The pawl 340 is similar to and generally parallel to the pawl 328. The spacing between the two pawls 328 and 340 along the rockshaft 326 is such that the pawl 340 engages a projection on the workpiece 8 on the first idle station on the rails 302 as the pawl 328 engages a workpiece in the workholder 26₄ to be unloaded. Subsequent retraction of the slide 306 traverses the workpiece from the first idle station to the second idle station on the slide rails 302, located near the outer end of the support bed 300.

In a similar manner a third pawl 342 fixed to the extreme outer end of the rockshaft 326 a short distance from the pawl 300 engages the inner or workholder end of the workpiece 8 on the second idle station as the slide 306 and rockshaft 326 are operated to extract a third workpiece from the next succeeding workholder 26₄. The pawl 342 traverses the workpiece from the second idle station on the bed 300 onto the next station in the line which may be an inspection station for checking the size of the holes machined at the two machining stations of the workpiece support 24.

Proper location of the workpieces in each of the two idle stations on the workpiece support rails 302 is assured by a rockable stop dog assembly 344 mounted on the side of the bed 300 opposite the unloading mechanism 32. As shown, the stop dog assembly 344 comprises a rockshaft 346 mounted in two brackets 348, 350 on the side of the bed 300 and extending substantially the full length of the bed in parallel relation to the workpiece support rails 302.

The bracket 348 on the workholder end of the bed 300 is of substantial size and provides a mount 352 for a swingable reversing cylinder 354 connected to a radial arm 356 on the shaft 346 for rocking the shaft in reverse directions. A control switch 358 on the bracket 348 is operated by angularly spaced actuators 360 on the shaft 346, Fig. 13, as the latter reaches either extreme angular position. Two pairs of projecting dogs or pawls 362, 364 on the shaft 346 are spaced along the shaft to just clear opposite ends of workpieces properly positioned on the two idle stations on the rails 302. A fifth pawl 365 on the shaft 346 works in conjunction with the next workpiece station (not shown) to the right of the bed 300, Fig. 12.

The dogs 362, 364, 365 operate to assure proper positioning of the workpieces on the rails 302. The dogs are raised by the cylinder 354 each time the workpieces are to be traversed along the rails by the unloading mechanism 32 and again lowered back into operative position as soon as a workpiece indexing operation is completed. In the event a workpiece is improperly positioned on the rails 302, the rockshaft 246 and the attached locating dogs will fail to return to normal position, thus indicating through the switch 358 and suitable coacting structure that a correction must be made. Once the dogs are returned to normal position by the shaft 346 they operate to positively maintain the workpieces in proper position until they are again released by rotation of the shaft for shifting movement.

The invention thus provided solves in a practical, economical way troublesome problems previously associated with the use of automatic production lines of machine tools.

While I have shown and described a preferred embodiment of my invention, it will be apparent that variations and modifications thereof may be made without departing from the principles and scope of the invention. I therefore desire, by the following claim, to include all such variations and modifications by which substantially the results of my invention may be obtained through the use of substantially the same or equivalent means.

I claim:

In machine tool processing apparatus, the combination of an annular array of workholders, a rotary indexing support supporting all of said workholders for indexing movement through a closed course, means defining a machining zone extending along a portion of said closed course, said course between opposite extremities of said machining zone forming a loading and unloading zone, hydraulic clamping means on said respective workholders for clamping workpieces therein, a first hydraulic system for clamping and unclamping said hydraulic clamping means, a second hydraulic clamping system for maintaining a powerful clamping pressure at a constant pressure level, rotary manifold valve means connected between said first and second hydraulic systems and said workpiece clamping means on all of said workholders, said manifold valve means including a central member of cylindrical shape defining therein a plurality of axial bores interconnected with said first and second hydraulic systems, the exterior cylindrical surface of said central manifold member defining a pattern of recesses therein tiered along the axis thereof and interconnected with said central bores, said manifold valve means including a sleeve member internally receiving said central manifold member and rotatable thereon as an incident to indexing movement of said workholder support, said sleeve member defining therein a plurality of radial bores arranged in annular arrays tiered along the axis thereof to be moved into registry with various ones of said recesses as an incident to indexing movement of said workpiece support, and conduit means connecting said sleeve bores with said hydraulic clamping means on said workholders in accordance with a predetermined pattern, said recesses in said central manifold member and said radial bores in said sleeve member being arranged circumferentially and axially with respect to the respective members to effect as an incident to rotary indexing movement of said workholder support an automatic connection between said first hydraulic system and the hydraulic clamping means on each workholder as the workholder moves to the loading and unloading zone and to automatically disconnect the first hydraulic system from the hydraulic clamping means on each workholder moving from the loading and unloading zone toward the machining zone while serving simultaneously to connect automatically the second hydraulic system with the hydraulic clamping means on each workholder moving to the machining zone and automatically disconnect the second hydraulic system for the hydraulic clamping means on each workholder moving away from the machining zone.

References Cited in the file of this patent

UNITED STATES PATENTS

| | | |
|---|---|---|
| 2,093,111 | Montgomery | Sept. 14, 1937 |
| 2,361,091 | Edelmann et al. | Oct. 24, 1944 |
| 2,415,037 | Redmer | Jan. 28, 1947 |